(12) United States Patent
Sugiyama et al.

(10) Patent No.: US 7,303,658 B2
(45) Date of Patent: Dec. 4, 2007

(54) GLASS COATED WITH HEAT REFLECTING COLORED FILM AND PROCESS FOR ITS PRODUCTION

(75) Inventors: Takashi Sugiyama, Yokohama-shi (JP); Eiichi Ando, Yokohama-shi (JP)

(73) Assignee: Asahi Glass Company, Limited, Tokyo (JP)

( * ) Notice: Subject to any disclaimer, the term of this patent is extended or adjusted under 35 U.S.C. 154(b) by 192 days.

(21) Appl. No.: 11/003,738

(22) Filed: Dec. 6, 2004

(65) Prior Publication Data

US 2005/0153159 A1 Jul. 14, 2005

Related U.S. Application Data

(60) Division of application No. 10/649,796, filed on Aug. 28, 2003, now abandoned, which is a division of application No. 10/266,751, filed on Oct. 9, 2002, now Pat. No. 6,706,407, which is a continuation of application No. PCT/JP01/03518, filed on Apr. 24, 2001.

(30) Foreign Application Priority Data

Apr. 28, 2000 (JP) .............................. 2000-129278

(51) Int. Cl.
*C23C 14/34* (2006.01)
(52) U.S. Cl. ........................... 204/192.27; 204/192.26; 204/192.28
(58) Field of Classification Search ........... 204/192.26, 204/192.27, 192.28
See application file for complete search history.

(56) References Cited

U.S. PATENT DOCUMENTS 4,022,947 A * 5/1977 Grubb et al. ................ 428/432
4,786,784 A * 11/1988 Nikodem et al. ............ 219/543
4,891,113 A * 1/1990 Criss ...................... 204/192.15
5,721,054 A 2/1998 Vandiest et al.
6,291,074 B1 * 9/2001 Sakai et al. .................. 428/433
6,706,407 B2 3/2004 Sugiyama et al.

FOREIGN PATENT DOCUMENTS

| CA | 1 117 383 | 2/1982 |
|---|---|---|
| DE | 43 05 414 A1 | 8/1994 |
| EP | 0 735 009 A1 | 10/1996 |
| GB | 2 285 634 | 7/1995 |
| JP | 54-66194 | 5/1979 |
| JP | 9-30832 | 2/1997 |
| JP | 9-30837 | 2/1997 |
| JP | 9-86966 | 3/1997 |
| WO | WO 01/83392 A1 | 8/2001 |

OTHER PUBLICATIONS

Patent Abstracts of Japan, JP 09-086966, Mar. 31, 1997.
J. L. Vossen, et al., "Some experiments that provide direct visualization of reactive sputtering phenomena", J. Vac. Sci. Technol. A, vol. 9, No. 3, XP-002036122, May and Jun. 1991, pp. 600-603.

* cited by examiner

*Primary Examiner*—Rodney G. McDonald
(74) *Attorney, Agent, or Firm*—Oblon, Spivak, McClelland, Maier & Neustadt, P.C.

(57) ABSTRACT

A glass coated with a heat reflecting colored film, which is excellent in the uniformity of the film thickness and composition, which is free from a unfavorable whitish coloration in ceramic color printing and which is excellent in a silver print coloration, is presented. A glass coated with a heat reflecting colored film, obtained by heat treatment of a glass having a first layer containing iron oxide, chromium oxide and nickel oxide and a second layer containing cobalt oxide, laminated sequentially by a sputtering method, on one side of a glass substrate.

10 Claims, No Drawings

GLASS COATED WITH HEAT REFLECTING COLORED FILM AND PROCESS FOR ITS PRODUCTION

This application is a division of 10/649,796 filed Aug. 28, 2003, now abandoned, which is a division of 10/266,751 filed Oct. 9,2002, now U.S. Pat. No. 6,706,407, which is a continuation of International Application Number PCT/JP01/03518 filed Apr. 24, 2001.

TECHNICAL FIELD

The present invention relates to a glass coated with a heat reflecting colored film and a process for its production.

BACKGROUND ART

In recent years, it has become common to employ a heat reflecting glass having a low solar energy transmittance (a ratio of directly transmitting energy to incident solar energy) as a means to increase cooling efficiency of e.g. a vehicle such as an automobile. As a method to reduce the solar energy transmittance, a method of employing a colored glass or a method of coating a colored film which is excellent in the heat reflecting performance on a transparent soda lime glass or on a colored glass having a high transmittance, is available. The latter method is preferred from the viewpoint of the heat reflecting performance and recycling of the glass.

What are required for such a glass coated with a heat reflecting colored film, may, for example, be that the solar energy transmittance is low, the visible light transmittance is high as compared with the solar energy transmittance, it has sufficient durability for use for e.g. vehicles, it has a color tone which does not impair the design of e.g. vehicles, and it has a high sheet resistance. As a glass coated with a heat reflecting colored film which satisfies these requirements, a glass is known wherein an oxide film comprising cobalt oxide as the main component, at least 10 mass % (the ratio based on the total metal amount, the same applies hereinafter) of iron and at least 5 mass % of chromium, is formed in a thickness of from 10 to 50 nm by a spraying method.

However, such a glass has had a problem such that the film thickness, composition, etc. are non-uniform, and the yield is poor.

It is known in literatures to obtain, by a sputtering method, a glass having a film formed which comprises cobalt oxide as the main component and at least 5 mass % of iron oxide. For example, JP-A-9-30837 discloses a heat reflecting glass having a coating film of metal oxides formed with a metal composition such that cobalt: 65 to 96 mass %, chromium: 2 to 25 mass %, iron: 2 to 33 mass %, and a sputtering method is mentioned as a method for forming such a coating film.

However, in a magnetron sputtering method whereby the film-forming speed is remarkably higher than the conventional methods, which is suitable for a mass production of a film having uniform film thickness and composition and which is a sputtering method presently utilized industrially, an alloy target comprising cobalt and iron can not be practically used, since such an alloy target is a ferromagnetic material, whereby a magnetic flux of magnetron is hardly formed over the target surface. In the above publication, no specific disclosure is given with respect to a sputtering method, and only a spraying method is specifically described.

Heretofore, it has been common that a ceramic paste having a ceramic color composition formed into a paste, is screen-printed along the peripheral portion or the center portion of a window glass of an automobile, followed by drying and baking in a bending step. Such a ceramic color paste is baked e.g. along the peripheral portion of glass to form a colored opaque layer and thereby to be used for preventing deterioration of an adhesive by ultraviolet rays or to prevent the bonded portion from being seen through from outside the car. As such a ceramic color composition, one having a heat resistant coloring pigment mixed to a glass frit, is known and usually has a color tone of a black color or a dark gray color. Such a composition is called a black ceramic coating material.

However, when such a ceramic color paste is printed on a glass having formed by a spray method a conventional oxide film comprising cobalt oxide as the main component, at least 10 mass % of iron and at least 5 mass % of chromium, there has been a problem that unfavorable whitish coloration is likely to result.

Further, when a glass is used as e.g. a rear glass of an automobile, so-called silver printing is carried out, wherein a silver paste which is an exothermic material to prevent fogging, is linearly printed and baked. However, a conventional glass having formed by a spray method an oxide film comprising cobalt oxide as the main component, at least 10 mass % of iron and at least 5 mass % of chromium, has had a problem that coloration of this silver print is poor (such that it forms an antique red color).

Accordingly, the above-mentioned glass coated with a heat reflecting colored film, cannot practically be produced by means of a magnetron sputtering method, and the above-mentioned problems such as formation of non-uniformity in the case of the production by the above-mentioned spray method, unfavorable whitish coloration in ceramic color printing, and poor coloration of silver printing, have not been solved.

It is an object of the present invention to provide a glass coated with a heat reflecting colored film, which can be produced by a sputtering method, which is excellent in the uniformity of the film thickness and composition and which is excellent in heat reflectivity, and a process for its production. Further, it is another object of the present invention to provide a glass coated with a heat reflecting colored film, which is excellent in the uniformity of the film thickness and composition, which is free from unfavorable whitish coloration in ceramic color printing and which is excellent in coloration of silver printing.

DISCLOSURE OF THE INVENTION

As a result of an extensive research, the present inventors have found that 1) a glass coated with a heat reflecting colored film, which comprises a glass substrate, and a specific first layer and a specific second layer, laminated sequentially by a sputtering method on one side of the glass substrate, is excellent in the uniformity of the film thickness and composition and excellent in the heat reflectivity, and that 2) a glass coated with a heat reflecting colored film obtained by heat treatment of such glass coated with a heat reflecting colored film, not only satisfies the basic required characteristics such that the solar energy transmittance is low, the visible light transmittance is higher than the solar energy transmittance, it has adequate durability for e.g. a vehicle, it has a color tone which does not impair the design for e.g. a vehicle, and the sheet resistance is high, but also is excellent in the uniformity of the film thickness and composition, free from unfavorable whitish coloration in ceramic color printing and excellent in coloration of silver printing, and thus have accomplished the present invention.

The present invention provides a glass coated with a heat reflecting colored film (hereinafter referred to also as "glass A coated with a heat reflecting colored film"), which comprises a glass substrate, and a first layer containing iron oxide and a second layer containing cobalt oxide, laminated sequentially by a sputtering method on one side of the glass substrate, wherein:

in the first layer, the amount of iron based on the total metal amount is at least 60 mass %, and in the second layer, the amount of cobalt based on the total metal amount is at least 60 mass %.

Further, the present invention provides a glass coated with a heat reflecting colored film (hereinafter referred to also as "glass B coated with a heat reflecting colored film"), which comprises a glass substrate, and a first layer containing cobalt oxide and a second layer containing iron oxide, laminated sequentially by a sputtering method on one side of the glass substrate, wherein:

in the first layer, the amount of cobalt based on the total metal amount is at least 60 mass %, and in the second layer, the amount of iron based on the total metal amount is at least 60 mass %.

Further, the present invention provides a glass coated with a heat reflecting colored film (hereinafter referred to also as "glass C coated with a heat reflecting colored film"), which comprises a glass substrate, and a first layer containing iron oxide, chromium oxide and nickel oxide and a second layer containing cobalt oxide, laminated sequentially by a sputtering method on one side of the glass substrate, wherein:

in the first layer, the amounts of iron, chromium and nickel, based on the total metal amount, are as follows:

iron: from 60 mass % to 85 mass %, chromium: from 10 mass % to 28 mass %, and nickel: from 5 mass % to 24 mass %, and in the second layer, the amount of cobalt based on the total metal amount is at least 60 mass %.

Further, the present invention provides a glass coated with a heat reflecting colored film (hereinafter referred to also as "glass D coated with a heat reflecting colored film"), which comprises a glass substrate, and a first layer containing cobalt oxide and a second layer containing iron oxide, chromium oxide and nickel oxide, laminated sequentially by a sputtering method on one side of the glass substrate, wherein:

in the first layer, the amount of cobalt based on the total metal amount, is at least 60 mass %, and in the second layer, the amounts of iron, chromium and nickel, based on the total metal amount, are as follows:

iron: from 60 mass % to 85 mass %, chromium: from 10 mass % to 28 mass %, and nickel: from 5 mass % to 24 mass %.

Further, the present invention provides a process for producing the above-mentioned glass A coated with a heat reflecting colored film, which comprises:

a step of laminating the first layer on one side of the glass substrate, by sputtering by means of a metal oxide target containing iron oxide, and a step of laminating the second layer on the first layer, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas.

Further, the present invention provides a process for producing the above-mentioned glass B coated with a heat reflecting colored film, which comprises:

a step of laminating the first layer on one side of the glass substrate, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas, and a step of laminating the second layer on the first layer, by sputtering by means of a metal oxide target containing iron oxide.

Further, the present invention provides process for producing the above-mentioned glass C coated with a heat reflecting colored film, which comprises:

a step of laminating the first layer on one side of the glass substrate, by sputtering by means of a metal target containing iron, chromium and nickel as components in a sputtering gas atmosphere containing an oxidizing gas, and a step of laminating the second layer on the first layer, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas.

Further, the present invention provides a process for producing the above-mentioned glass D coated with a heat reflecting colored film, which comprises:

a step of laminating the first layer on one side of the glass substrate, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas, and a step of laminating the second layer on the first layer, by sputtering by means of a metal target containing iron, chromium and nickel as components in a sputtering gas atmosphere containing an oxidizing gas.

Further, the present invention provides a glass coated with a heat reflecting colored film (hereinafter referred to also as "glass E coated with a heat reflecting colored film", obtained by heat treatment of the above-mentioned glass A, B, C or D coated with a heat reflecting colored film.

The above-mentioned glass E coated with a heat reflecting colored film is preferably such that the surface sheet resistance of the film-coated side is at least $10^5$ Ω/□.

The above-mentioned glass E coated with a heat reflecting colored film is preferably such that the visible light transmittance is from 20 to 40%, and the visible light reflectance of the film-coated side and the other side is from 20 to 40% and from 10 to 25%, respectively.

Further, the present invention provides a process for producing the above-mentioned glass E coated with a heat reflecting colored film, which comprises:

a step of coating a ceramic color paste and/or a silver paste on the above-mentioned glass A, B, C or D coated with a heat reflecting colored film obtained by the process as defined in any one of the above-mentioned processes, and a step of then carrying out heat treatment.

BEST MODE FOR CARRYING OUT THE INVENTION

Now, the present invention will be described in detail.

Each of glasses A, B, C and D coated with a heat reflecting colored film of the present invention, is a glass coated with a heat reflecting colored film, which comprises a glass substrate, and a specific first layer and a specific second layer, laminated sequentially by a sputtering method on one side of the glass substrate. Now, glasses A, B, C and D coated with a heat reflecting colored film of the present invention, will be described.

The glass substrate to be used for glasses A, B, C and D coated with a heat reflecting colored film of the present invention, is not particularly limited, and a commonly widely employed colorless transparent soda lime glass, a heat absorbing glass colored green, bronze, gray or the like, or a glass having a heat absorbing/ultraviolet absorbing property, may, for example, be employed. The first layer of glass A coated with a heat reflecting colored film, contains iron oxide. In the present invention, in addition to iron oxide, chromium oxide, nickel oxide, niobium oxide, molybdenum oxide, manganese oxide, silicon oxide, copper oxide, vanadium oxide, zinc oxide, zirconium oxide, carbon, etc., may be contained within the range of the following composition.

In the first layer of glass A coated with a heat reflecting colored film, the amount of iron based on the total metal amount is at least 60 mass %. The upper limit value is not particularly limited, and it may be used at most 100%. With a view to reducing the solar energy transmittance, it is preferably used in an amount of at least 90%, particularly at least 97%.

The thickness of the first layer of glass A coated with a heat reflecting colored film, can be selected depending upon the desired optical characteristics. For example, the thickness of the first layer is preferably adjusted to be from 3 to 15 nm, in a case where the visible light transmittance of the glass coated with a heat reflecting colored film of the present invention is made to be from 20 to 40%, and the visible light reflectance of the film-coated side and the other side is made to be from 20 to 40% and from 10 to 25%, respectively.

The second layer of glass A coated with a heat reflecting colored film, contains cobalt oxide. In the present invention, in addition to the cobalt oxide, niobium oxide, molybdenum oxide, manganese oxide, silicon oxide, copper oxide, vanadium oxide, zinc oxide, zirconium oxide, carbon, etc., may be contained within the range of the following composition.

In the second layer of glass A coated with a heat reflecting colored film, the amount of cobalt based on the total metal amount, is at least 60 mass %. The upper limit value is not particularly limited, and it may be used in an amount of at most 100%. With a view to reducing the solar energy transmittance, it is preferably used in an amount of at least 90%, particularly at least 97%.

The thickness of the second layer of glass A coated with heat reflecting colored film, can be selected depending upon the desired optical characteristics. For example, the thickness of the second layer is preferably adjusted to be from 10 to 50 nm, in a case where the visible light transmittance of the glass coated with a heat reflecting colored film of the present invention is made to be from 20 to 40%, and the visible light reflectance of the film-coated side and the other side is made to be from 20 to 40% and from 10 to 25%, respectively.

With respect to the composition, the preferred thickness, etc., the first layer of glass B coated with a heat reflecting colored film, is similar to the second layer of the above-mentioned glass A coated with a heat reflecting colored film.

With respect to the composition, the preferred thickness, etc., the second layer of glass B coated with a heat reflecting colored film, is similar to the first layer of the above-mentioned glass A coated with a heat reflecting colored film.

The first layer of glass C coated with a heat reflecting colored film, contains iron oxide, chromium oxide and nickel oxide. In the present invention, in addition to these oxides, niobium oxide, molybdenum oxide, manganese oxide, silicon oxide, copper oxide, vanadium oxide, zinc oxide, zirconium oxide, carbon, etc., may be contained with the range of the following composition.

From the viewpoint of the heat reflectivity and efficiency in the film formed by a magnetron sputtering method, in the first layer of glass C coated with a heat reflecting colored film, the amounts of iron, chromium and nickel, based on the total metal amount, are such that iron: from 60 mass % to 85 mass %, chromium: from 10 mass % to 28 mass %, and nickel: from 5 mass % to 24 mass %.

The thickness of the first layer of glass C coated with a heat reflecting colored film, can be selected depending upon the desired optical characteristics. For example, the thickness of the first layer is preferably adjusted to be from 3 to 15 nm, in a case where the visible light transmittance of the glass coated with a heat reflecting colored film of the present invention is made to be from 20 to 40%, and the visible light reflectance of the film-coated side and the other side is made to be from 20 to 40% and from 10 to 25%, respectively.

With respect to the composition, the preferred thickness, etc., the second layer of glass C coated with a heat reflecting colored film, is similar to the second layer of the above-mentioned glass A coated with a heat reflecting colored film.

With respect to the composition, the preferred thickness, etc., the first layer of glass D coated with a heat reflecting colored film, is similar to the second layer of the above-mentioned glass C coated with a heat reflecting colored film.

With respect to the composition, the preferred thickness, etc., the second layer of glass D coated with a heat reflecting colored film, is similar to the first layer of the above-mentioned glass C coated with a heat reflecting colored film.

Further, in the present invention, for the purpose of e.g. improving the durability or changing the reflectance, a functional layer to accomplish such an object may be provided on the second layer, between the first layer and the glass substrate, or on the side opposite to the side coated with the heat reflecting colored film.

As such a functional layer, a layer made of at least one element selected from the group consisting of silicon, titanium, zinc, tin, copper, zirconium, manganese, niobium and aluminum, or an oxide or nitride of such an element, may be mentioned.

The glass coated with a heat reflecting colored film of the present invention, has a film construction which can be formed by a sputtering method, whereby it is excellent in the uniformity of the film thickness and composition.

In the processes for producing glasses A, B, C and D coated with a heat reflecting colored film of the present invention, the above-described first layer and the above-described second layer may be sequentially laminated by a sputtering method on one side of the above-mentioned glass substrate, but they are particularly preferably carried out as follows, in that conventional sputtering targets can thereby be employed. It should be understood that the following processes are preferred embodiments, and the processes for producing glasses A, B, C and D coated with a heat reflecting colored film of the present invention, are not limited thereto.

(1) In the Case of Glass A Coated with a Heat Reflecting Colored Film

Glass A coated with a heat reflecting colored film is produced by a process which comprises:

a step of laminating the first layer on one side of the glass substrate, by sputtering by means of a metal oxide target containing iron oxide, and a step of laminating the second layer on the first layer, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas.

As the metal oxide target to be used in the step of laminating the first layer, one containing iron oxide, is used. Particularly preferred is one which contains iron oxide in an amount of from 60 to 100 mass % as the amount of iron based on the total metal amount, in order to bring the composition of the first layer as described above.

The sputtering gas may be one containing no oxidizing gas or may be one containing an oxidizing gas.

The sputtering gas containing no oxidizing gas may, for example, be an inert gas such as helium, neon, argon, krypton or xenon. Among them, argon is preferred from the viewpoint of the economical efficiency and ease of discharge. These inert gases may be used alone or in combination as a mixture of two or more of them.

The oxidizing gas may, for example, be oxygen or ozone, or it may be a gas mixture of oxygen and ozone. As the sputtering gas containing an oxidizing gas, a gas mixture of such an oxidizing gas and the above-mentioned inert gas, may be employed.

For the sputtering, a magnetron sputtering apparatus which is excellent in the film forming speed, etc., is usually employed. However, a sputtering apparatus of a type wherein no magnetic field is used, may also be employed.

Further, as the power source, any of a direct current power source, a power source for applying an electric power in pulses, an alternate current power source and a high frequency power source, may be employed.

As the target to be used for the step of laminating the second layer, a metal target containing cobalt, or a metal oxide target containing cobalt oxide, is used. Particularly, in order to adjust the composition of the second layer as described above, when a metal target containing cobalt is employed, it preferably contains cobalt in an amount of from 60 to 100 mass %, and when a metal oxide target containing cobalt oxide is employed, it preferably contains cobalt oxide in an amount of from 60 to 100 mass % as the amount of cobalt based on the total metal amount.

As the sputtering gas, one containing an oxidizing gas is employed in the case where a metal target containing cobalt is employed. As the oxidizing gas, the above-mentioned one may be employed.

In a case where a metal oxide target containing cobalt oxide is employed, the sputtering gas may be one containing no oxidizing gas, or one containing an oxidizing gas. As such an oxidizing gas, the above-mentioned one may also be employed.

When either target is employed, a gas mixture comprising an oxidizing gas and an inert gas, may be employed.

The sputtering apparatus is the same as in the case of the process of laminating the first layer.

(2) In the Case of Glass B Coated with a Heat Reflecting Colored Film

Glass B coated with a heat reflecting colored film is produced by a process which comprises:

a step of laminating the first layer on one side of the glass substrate, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas, and a step of laminating the second layer on the first layer, by sputtering by means of a metal oxide target containing iron oxide.

The metal target, the sputtering gas and the sputtering apparatus to be used in the step of laminating the first layer, are the same as in the case of the second layer in process (1).

The metal target, the sputtering gas and the sputtering apparatus to be used in the step of laminating the second layer, are the same as in the case of the first layer in process (1).

(3) In the Case of Glass C Coated with a Heat Reflecting Colored Film

Glass C coated with a heat reflecting colored film, is produced by a process which comprises:

a step of laminating the first layer on one side of the glass substrate, by sputtering by means of a metal target containing iron, chromium and nickel as components in a sputtering gas atmosphere containing an oxidizing gas, and a step of laminating the second layer on the first layer, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas.

The metal target to be used in the step of laminating the first layer is not particularly limited with respect to the composition or structure. Among iron, chromium and nickel, two or more metals may form a single crystal phase or may be in the form of a solid solution. Otherwise, crystalline phases or non-crystalline phases of the above two or more metals may be present in a mixed state, or masses of the above two or more metals may be separately present, respectively. In the present invention, as the metal target, a metal target containing iron, chromium and nickel as components, is used from the viewpoint of discharge. Particularly in order to adjust the composition of the first layer a described above, one having the following composition is preferred:

Iron: from 63 to 78 mass %,

Chromium: from 16 to 24 mass %, and

Nickel: from 6 to 13 mass %.

For example, a non-magnetic stainless steel, more specifically, an austenite type non-magnetic stainless steel as stipulated in JIS G4304-1987, may be mentioned. Particularly preferred is SUS304.

As a preferred example for the target to be used in the step of laminating the second layer, a Co target or a $Co_3O_4$ target may be mentioned.

As the sputtering gas, one containing an oxidizing gas is employed. The oxidizing gas is as described above. Further, a gas mixture comprising an oxidizing gas and an inert gas may be employed.

The apparatus to be used for the sputtering is the same as in the case of the first layer in process (1).

The step of laminating the second layer is the same as in the case of process (1).

(4) In the Case of Glass D Coated with a Heat Reflecting Colored Film

Glass D coated with a heat reflecting colored film is produced by a process which comprises:

a step of laminating the first layer on one side of the glass substrate, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas, and a step of laminating the second layer on the first layer, by sputtering by means of a metal target containing iron, chromium and nickel as components in a sputtering gas atmosphere containing an oxidizing gas.

The metal target, the sputtering gas and the sputtering apparatus to be used in the process of laminating the first layer, are the same as in the case of the second layer in process (3).

The metal target, the sputtering gas and the sputtering apparatus to be used in the step of laminating the second layer, are the same as in the case of the first layer in process (3).

Glasses A, B, C and D coated with a heat reflecting colored film of the present invention are excellent in the heat reflectivity. Specifically, the solar energy transmittance is preferably smaller than the visible light transmittance, particularly preferably at most 40% (more preferably at most 35%).

As described in the foregoing, glasses A, B, C and D coated with a heat reflecting colored film of the present invention are excellent in the uniformity of the film thickness and composition, since they can be produced by a sputtering method. Further, they exhibit excellent heat reflectivity. Further, as described hereinafter, glasses A, B, C and D coated with a heat reflecting colored film of the present invention, are suitably employed for the production of glass E coated with a heat reflecting colored film of the present invention.

Now, glass E coated with a heat reflecting colored glass of the present invention will be described.

The glass coated with a heat reflecting colored film of the present invention can be obtained by heat treatment of the above-mentioned glass A, B, C or D coated with a heat reflecting colored film.

By the heat treatment, the surface sheet resistance of the film-coated side will be improved, and the surface sheet resistance of the film-coated side will be preferably at least $10^5$ $\Omega/\square$, whereby the radio wave transmittance will be improved. Accordingly, it is suitably employed for vehicles or buildings.

Further, by the heat treatment, visible light reflectance of the film-coated side is decreased, preferably to a level of from 20 to 40%, which is a value suitable for vehicles.

The heat treatment is not particularly limited, and the conditions may be changed depending upon the desired optical characteristics. As a preferred specific example, heat treatment may be mentioned which is carried out at a temperature of from 500 to 700° C. for from 3 to 5 minutes in an atmosphere containing oxygen (such as the atmospheric air).

Glass E coated with a heat reflecting colored film of the present invention is suitably employed for e.g. vehicles such as automobiles. The glass to be used for e.g. vehicles such as automobiles, is subjected to heat treatment in the atmosphere at a temperature of from 630 to 690° C. or higher for from 3 to 7 minutes in the case of bending treatment. Accordingly, glass E coated with a heat reflecting colored film of the present invention may be obtained by subjecting glass A, B, C or D coated with a heat reflecting colored film to bending treatment and by utilizing the heat treatment at that time.

Further, when silver printing or printing by means of a ceramic color paste such as a black ceramic coating material, is applied to glass A, B, C or D coated with a heat reflecting colored film of the present invention, heat treatment (baking) is carried out in the atmosphere at a temperature of from 630 to 690° C. or higher for from about 3 to 7 minutes. Accordingly, glass E coated with a heat reflecting colored film of the present invention may also be obtained by applying silver printing or printing by means of a ceramic color paste to glass A, B, C or D coated with a heat reflecting colored film and utilizing the heat treatment (baking) at that time.

Further, the bending treatment and silver printing or printing by means of a ceramic color paste, may be carried out simultaneously, and heat treatment at that time may be utilized.

Namely, the process for producing glass E coated with a heat reflecting colored film of the present invention may preferably be a process which comprises:

a step of coating a ceramic color paste and/or a silver paste on glass A, B, C or D coated with a heat reflecting colored film obtained by any one of the above-mentioned processes (1) to (4), and a step of then carrying out heat treatment.

Coating of the ceramic color paste and/or the silver paste can be carried out by a usual method. For example, a screen printing method by means of a screen printing machine may be mentioned. In a case where both the ceramic color paste and the silver paste are to be coated, they may be separately coated or may be simultaneously coated.

The conditions for the heat treatment may be the same as in the case where they are not coated.

The ceramic color paste may, for example, be one containing crystalline glass frit (and/or non-crystalline glass frit), a heat resistant coloring pigment and a refractory filler. The ceramic color paste may, for example, be prepared by uniformly mixing the crystalline glass frit (and/or the non-crystalline glass frit), the heat resistant coloring pigment and the refractory filler in an organic vehicle and adjusting the mixture to a viscosity suitable for coating.

As the silver paste, one having fine silver particles and glass frit uniformly mixed to an organic vehicle, is adjusted to a viscosity suitable for coating.

Glass E coated with a heat reflecting colored film of the present invention, is excellent in the heat reflectivity. Specifically, the solar energy transmittance is preferably smaller than the visible light transmittance, particularly preferably at most 40% (more preferably at most 35%).

Glass E coated with a heat reflecting colored film of the present invention preferably has a surface sheet resistance of at least $10^5$ $\Omega/\square$ on the film-coated side. If the surface sheet resistance is within the above range, it is possible to secure adequate transmittance of radio waves of e.g. radios, televisions, mobile phones or car phones in e.g. vehicles such as automobiles.

Further, when glass E coated with a heat reflecting colored film of the present invention is employed as a rear window glass of an automobile, the surface sheet resistance on the film-coated side is preferably at least $10^6$ $\Omega/\square$.

Glass E coated with a heat reflecting colored film of the present invention is preferably such that the visible light transmittance is from 20 to 40%, and the visible light reflectance on the film-coated side and the other side is from 20 to 40% and from 10 to 25%, respectively. Within the above ranges, glass E is suitable for application to e.g. automobiles.

Glass E coated with a heat reflecting colored film of the present invention is excellent in the uniformity of the film thickness and composition as compared with one prepared by a conventional spray method, since the colored film is formed by a sputtering method.

As is different from a conventional glass having formed by a spray method an oxide film comprising cobalt oxide as the main component, at least 10 mass % of iron and at least 5 mass % of chromium, glass E coated with a heat reflecting colored film of the present invention is free from whitening or color forming failure when printing is applied by means of a ceramic color paste such as black ceramic coating material, although the reason is not clearly understood. Further, as is different from a conventional glass having formed by a spray method an oxide film comprising cobalt oxide as the main component, at least 10 mass % of iron and at least 5 mass % of chromium, glass E coated with a heat reflecting colored film is excellent in coloration of silver printing, although the reason is not clearly understood.

Applications of glass E coated with a heat reflecting colored film of the present invention are not particularly limited, but, for example, applications for vehicles such as automobiles, or for buildings, may be mentioned.

Further, the glass coated with a heat reflecting colored film of the present invention may be made into a laminated glass or a composite glass.

Glass E coated with a heat reflecting colored film of the present invention is useful for various applications, since not only it satisfies the basic required characteristics, but also it is excellent in the uniformity of the film thickness and composition, free from unfavorable whitish coloration in ceramic color printing and also excellent in coloration of silver printing.

EXAMPLES

Now, the present invention will be described in further detail with reference to Examples, but the present invention is by no means restricted thereto.

1. Preparation of Glass Coated with Heat Reflecting Colored Film

Example 1

A green-colored soda lime glass having a thickness of 3.5 mm and cut into a square of 100×100 mm, was washed with a cerium oxide powder and a neutral detergent and then rinsed with pure water and ethanol to obtain a substrate glass. The green-colored soda lime glass had a visible light transmittance of 81.6%, a visible light reflectance of 7.4%, a solar radiation transmittance of 59.5% and a solar radiation reflectance of 6.2%.

On this substrate glass, a film (first layer) having a thickness of 6 nm was formed by carrying out film forming by means of a DC magnetron sputtering apparatus using a sputtering target of FeO (amount of iron based on the total metal amount: 99.9 mass %) having a diameter of 101.6 mm under such conditions that the Ar gas pressure was $4.8\times10^{-1}$ Pa, the applied power was 0.3 kW and the film forming time was 6 seconds.

Further, on that film, a film (second layer) having a thickness of 30 nm was formed by carrying out film forming by means of a DC magnetron sputtering apparatus using a sputtering target of $Co_3O_4$ (amount of cobalt based on the total metal amount: 99.9 mass %) having a diameter of 101.6 mm under such conditions that the Ar gas pressure was $4.8\times10^{-1}$ Pa, the applied power was 0.3 kW and the film-forming time was 147 seconds, to obtain glass A coated with a heat reflecting colored film of the present invention.

Then, a ceramic color paste and an electroconductive silver paste were prepared to have viscosities suitable for screen printing. Then, the ceramic color paste was printed on the film-coated side of the obtained glass A having a heat reflecting colored film by a screen printing machine and dried. Then, the electroconductive silver paste was printed by a screen printing machine. After drying at 120° C. for from 10 to 15 minutes, heat treatment was carried out for about 15 minutes in the atmospheric air by a belt furnace. The retention time at a temperature of at least 500° C. was about 6 minutes, and the retention time at the maximum temperature of 650° C. was about 3 minutes. After the heat treatment, the treated product was left to cool to obtain glass E coated with a heat reflecting colored film of the present invention.

Here, the ceramic color paste used, was one prepared by mixing an amorphous glass frit, a heat resistant coloring pigment and a refractory filler uniformly to an organic vehicle, followed by adjusting the mixture to a viscosity suitable for coating. Further, the employed electroconductive silver paste was one prepared by mixing fine silver particles and a glass frit uniformly with an organic vehicle, followed by adjusting the mixture to a viscosity suitable for coating.

Example 2

Glass B coated with a heat reflecting colored film of the present invention was obtained in the same manner as in Example 1 except that the order of film formation of the first and the second layers was reversed. The thickness of the first layer was 30 nm, and the thickness of the second layer was 6 nm.

Then, to the obtained glass B coated with a heat reflecting colored film, printing and heat treatment were applied in the same manner as in Example 1, and then the treated product was left to cool to obtain glass E coated with a heat reflecting colored film of the present invention.

Example 3

The same green-colored soda lime glass as in Example 1 having a thickness of 3.5 mm and cut into a square of 100×100 mm, was washed with a cerium oxide powder and a neutral detergent, and then rinsed with pure water and ethanol to obtain a substrate glass.

On this substrate glass, a film having a thickness of 6 nm was formed by carrying out film forming by means of a DC magnetron sputtering apparatus using a sputtering target of SUS304 stainless steel (iron: 74 mass %, chromium: 18 mass %, nickel: 8 mass %) having a diameter of 152.4 mm under such conditions that the $O_2$ gas pressure was $2.6\times10^{-1}$ Pa, the applied power was 0.5 kW, and the film forming time was 30 seconds.

Further, on that film, a film having a thickness of 30 nm was prepared by carrying out film forming by means of a DC magnetron sputtering apparatus using a sputtering target of cobalt having a thickness of 3 mm and a diameter of 152.4 mm under such conditions that the $O_2$ gas pressure was $2.6\times10^{-1}$ Pa, the applied power was 0.5 kW, and the film-forming time was 150 seconds, to obtain glass C coated with a heat reflecting colored film of the present invention.

Then, to the obtained glass C coated with a heat reflecting colored film, printing and heat treatment were applied in the same manner as in Example 1. The obtained product was left to cool to obtain glass E coated with a heat reflecting colored film of the present invention.

Example 4

Glass D coated with a heat reflecting colored film of the present invention was obtained in the same manner as in Example 3 except that the order of film forming of the first and second layers was reversed. The thickness of the first layer was 30 nm and the thickness of the second layer was 6 nm.

Then, to the obtained glass D coated with a heat reflecting colored film, printing and heat treatment were applied in the same manner as in Example 1. Then, the treated product was left to cool to obtain glass E coated with a heat reflecting colored film of the present invention.

2. Compositions of Coating Films in the Glasses Coated with Heat Ray Reflecting Colored Films In the above-mentioned production processes of Examples 1 to 4, the composition of the first layer was analyzed after formation of the first layer and before formation of the second layer, and the composition of the second layer was analyzed after formation of the second layer and before the heat treatment. The analyses of the compositions were carried out by an elemental analysis by means of high frequency inductively coupled plasma emission mass spectrometry.

As a result, in Example 1, the amount of iron based on the total metal amount in the first layer was 99.9 mass %, and the amount of cobalt based on the total metal amount in the second layer was 99.9 mass %. In Example 2, the amount of cobalt based on the total metal amount in the first layer was 99.9 mass %, and the amount of iron based on the total metal amount in the second layer was 99.9 mass %.

Further, in Example 3, the amounts of iron, chromium and nickel, based on the total metal amount in the first layer were 74 mass % of iron, 18 mass % of chromium and 8 mass % of nickel, and the amount of cobalt based on the total metal amount in the second layer, was 99.9 mass %. In Example 4, the amount of cobalt based on the total metal amount in the first layer was 99.9 mass %, and the amounts of iron, chromium and nickel, based on the total metal amount in the second layer were 74 mass % of iron, 18 mass % of chromium and 8 mass % of nickel, respectively.

3. Measurement of the Solar Energy Transmittance

With respect to glasses A to D coated with heat reflecting colored films, obtained in Examples 1 to 4, the solar energy transmittance (according to JIS R3106) was measured by means of a spectrometer (the spectrometer "UV-3100PC", manufactured by Shimadzu Corporation).

As a result, the solar energy transmittance was at most 30%, in each case.

Further, with respect to glass E coated with heat reflecting colored films, obtained in Examples 1 to 4, the solar energy transmittance (according to JIS R3106) was measured by a spectrometer (spectrometer "UV-3100PC", manufactured by Shimadzu Corporation).

As a result, the solar energy transmittance was 29% in each case.

4. Measurement of the Surface Sheet Resistance

With respect to glass E coated with a heat reflecting colored film, obtained in each of Examples 1 to 4, the surface sheet resistance on the film-coated side was measured by means of a sheet resister.

As a result, the surface sheet resistance of the film-coated side was $1.0\times10^9$ $\Omega/\square$ in each case.

5. Measurements of Visible Light Transmittance and Visible Light Reflectance

With respect to glass E coated with a heat reflecting colored film obtained in each of Examples 1 to 4, the visible light transmittance (according to JIS R3106) and the visible light reflectance (according to JIS R3106) on the film-coated side and the other side, were measured by means of a spectrometer (spectrometer "UV-3100PC", manufactured by Shimadzu Corporation) using light source C.

As a result, the visible light transmittance was 31% in each case, the visible light reflectance on the film-coated side was 36% in each case, and the visible light transmittance on the other side was 21% in each case.

Further, the difference depending upon the measuring site in glass E coated with a heat reflecting colored film obtained in each of Examples 1 to 4 was within 0.5% in each case with respect to the visible light transmittance, and within 0.5% in each case with respect to the visible light reflectance. On the other hand, with a sample obtained by a conventional spray method, the difference depending upon the measuring site was from 1 to 2% with respect to the visible light transmittance, and from 1 to 2 with respect to the visible light reflectance. From this result, it is evident that the glass coated with a heat reflecting colored film of the present invention is excellent in the uniformity of the film thickness and in the uniformity of the composition.

6. Measurement of Scratch Resistance

With respect to glass E coated with a heat reflecting colored film obtained in each of Examples 1 to 4, a Taber's abrasion test on the film-coated side was carried out in accordance with an abrasion resistance test of JIS R3212 by means of Taber's tester under a condition of 1000 rotations under a load of 4.9N, and the visible light transmittances before and after the Taber's abrasion test, were compared.

As a result, the change in the visible light transmittance was +12% in each case, which is not higher than +20%, thus indicating practically adequate scratch resistance.

7. Measurement of Chemical Resistance

Glass E coated with a heat reflecting colored film obtained in each of Examples 1 to 4 was immersed in a 0.05 mol/l (50 mol/m$^3$) sulfuric acid aqueous solution or a 0.1 mol/l (100 mol/m$^3$) sodium hydroxide aqueous solution, at room temperature of 20° C. for 24 hours, whereby the visible light transmittances and the visible light reflectances of the film-coated side and the other side, before and after the immersion in the aqueous solution, were compared.

As a result, with each glass E coated with a heat reflecting colored film, the change in the visible light transmittance, or the change in the visible light reflectance on the film-coated side and the other side, was smaller than 1%, in the case of employing the aqueous sulfuric acid solution or the aqueous sodium hydroxide solution.

8. Measurements of the Color Tones of the Ceramic Color Print and the Silver Print With respect to glass E coated with a heat reflecting colored film, obtained in each of Examples 1 to 4, the color tone from the glass surface of the ceramic color paste portion, was measured by means of a color meter. As a result, the color tone was L=39, a=7.5 and b=0.0 in each case. This means that as compared with a case where a conventional glass having formed by a spray method an oxide film comprising 63 mass % of cobalt, 26 mass % of iron and 11 mass % of chromium, color formation was good with a color tone close to neutral with low brightness.

Further, with the glass having a film formed by a conventional spray method, the silver paste portion forms an antique red color, and no good coloration can be obtained. Whereas, with the samples of the present invention, each formed a red brown color, and thus good color formation was obtained.

INDUSTRIAL APPLICABILITY

Glasses A, B, C and D coated with heat reflecting colored films of the present invention can be prepared by a magnetron sputtering method. Especially, by the process for producing the glass coated with a heat reflecting colored film of the present invention, a conventional sputtering target can be used, whereby the production is easy, and the product is excellent in the uniformity of the film thickness and composition.

Further, glass E coated with a heat reflecting colored film of the present invention which is obtained by heat treatment of the above glass A, B, C or D coated with a heat reflecting colored film, not only satisfies the basic required characteristics, but also is excellent in the uniformity of the film thickness and composition, free from unfavorable whitish coloration in ceramic color printing and excellent also in the coloration of silver printing, and thus it is suitable as a window glass for an automobile.

The entire disclosure of Japanese Patent Application No. 2000-129278 filed on Apr. 28, 2000 including specification, claims and summary is incorporated herein by reference in its entirety.

What is claimed is:

1. A process for producing a glass coated with a heat reflecting colored film, which comprises:
    a step of laminating a first layer containing at least 60 mass % of iron, based on the total metal amount, on one surface of a glass substrate, by sputtering by means of a metal oxide target containing iron oxide, or by sputtering by means of a metal target containing iron, chromium and nickel as components in a sputtering gas atmosphere containing an oxidizing gas,
    a step of laminating a second layer containing at least 60 mass % of cobalt, based on the total metal amount, on the first layer, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas,
    a step of coating a ceramic color paste and/or a silver paste on the second layer, and then,
    a step of then carrying out heat treatment.

2. The process of producing a glass coated with a heat reflecting colored film of claim 1, wherein:
    in the first layer, the amounts of iron, chromium and nickel, based on the total metal amount, are as follows:
    iron: from 60 mass % to 85 mass %,
    chromium: from 10 mass % to 28 mass %, and
    nickel: from 5 mass % to 24 mass %.

3. The process of producing a glass coated with a heat reflecting colored film of claim 1, wherein:
    in the second layer, the amounts of iron, chromium and nickel, based on the total metal amount, are as follows:
    iron: from 60 mass % to 85 mass %,
    chromium: from 10 mass % to 28 mass %, and
    nickel: from 5 mass % to 24 mass %.

4. The process of producing a glass coated with a heat reflecting colored film of claim 1, which comprises a glass substrate, and a first layer containing iron oxide, chromium oxide and nickel oxide and a second layer containing cobalt oxide, laminated sequentially by a sputtering method on one side of the glass substrate, wherein:
    in the first layer, the amounts of iron, chromium and nickel, based on the total metal amount, are as follows:
    iron: from 60 mass % to 85 mass %,
    chromium: from 10 mass % to 28 mass %, and
    nickel: from 5 mass % to 24 mass %, and
    in the second layer, the amount of cobalt based on the total metal amount is at least 60 mass %.

5. The process for producing a glass coated with a heat reflecting colored film according to claim 1, wherein the surface sheet resistance of the film-coated side is at least 105 Ω/□.

6. The process for producing a glass coated with a heat reflecting colored film according to claim 1, wherein the visible light transmittance is from 20 to 40%, and the visible light reflectance of the film-coated side and the other side is from 20 to 40% and from 10 to 25%, respectively.

7. A process for producing a glass coated with a heat reflecting colored film, which comprises:
    a step of laminating a first layer containing at least 60 mass % of cobalt, based on the total metal amount, on one surface of a glass substrate, by sputtering by means of a metal target containing cobalt in a sputtering gas atmosphere containing an oxidizing gas, or by sputtering by means of a metal oxide target containing cobalt oxide in a sputtering gas atmosphere containing no oxidizing gas or in a sputtering gas atmosphere containing an oxidizing gas,
    a step of laminating a second layer containing at least 60 mass % of iron, based on the total metal amount, on the first layer, by sputtering by means of a metal oxide target containing iron oxide, or by sputtering by means of a metal target containing iron, chromium and nickel as components in a sputtering gas atmosphere containing an oxidizing gas,
    a step of coating a ceramic color paste and/or a silver paste on the second layer, and then,
    a step of then carrying out heat treatment.

8. The process of producing a glass coated with a heat reflecting colored film of claim 7, which comprises a glass substrate, and a first layer containing cobalt oxide and a second layer containing iron oxide, chromium oxide and nickel oxide, laminated sequentially by a sputtering method on one side of the glass substrate, wherein:
    in the first layer, the amount of cobalt based on the total metal amount, is at least 60 mass %, and in the second layer, the amounts of iron, chromium and nickel, based on the total metal amount, are as follows:

iron: from 60 mass % to 85 mass %, chromium: from 10 mass % to 28 mass %, and nickel: from 5 mass % to 24 mass %.

9. The process for producing a glass coated with a heat reflecting colored film according to claim 7, wherein the surface sheet resistance of the film-coated side is at least 105 Ω/□.

10. The process for producing a glass coated with a heat reflecting colored film according to claim 7, wherein the visible light transmittance is from 20 to 40%, and the visible light reflectance of the film-coated side and the other side is from 20 to 40% and from 10 to 25%, respectively.

* * * * *